US008284328B2

(12) United States Patent  
Shinki et al.

(10) Patent No.: US 8,284,328 B2
(45) Date of Patent: Oct. 9, 2012

(54) DISPLAY APPARATUS (75) Inventors: Yutaka Shinki, Osaka (JP); Tsuyoshi Tamura, Osaka (JP); Hideaki Katoh, Osaka (JP); Nobuyuki Kishimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 243 days.

(21) Appl. No.: 12/735,492

(22) PCT Filed: Jan. 21, 2009

(86) PCT No.: PCT/JP2009/050852
§ 371 (c)(1),
(2), (4) Date: Jul. 21, 2010

(87) PCT Pub. No.: WO2009/093600
PCT Pub. Date: Jul. 30, 2009

(65) Prior Publication Data
US 2010/0296009 A1 Nov. 25, 2010

(30) Foreign Application Priority Data
Jan. 22, 2008 (JP) .................................. 2008-011342

(51) Int. Cl.
*H04N 3/14* (2006.01)
(52) U.S. Cl. ....................................... 348/790; 348/739
(58) Field of Classification Search .................. 348/790, 348/794, 736, 739; 361/687, 690–697, 714–724; 313/587, 46, 11, 17, 582, 584; *H04N 3/14*
See application file for complete search history.

(56) References Cited

U.S. PATENT DOCUMENTS

| 7,667,964 | B2 * | 2/2010 | Kang et al. ..................... 361/692 |
| 7,705,536 | B2 * | 4/2010 | Yanagawa et al. ............. 313/582 |
| 7,944,712 | B2 * | 5/2011 | Kitada et al. ................... 361/810 |
| 8,094,447 | B2 * | 1/2012 | Kise et al. ................. 361/679.49 |
| 2002/0014840 | A1 | 2/2002 | Kaneko et al. |
| 2005/0243106 | A1 | 11/2005 | Bae et al. |

FOREIGN PATENT DOCUMENTS

| JP | 10-117315 A | 5/1998 |
| JP | 11-052872 | 2/1999 |
| JP | 11-251772 A | 9/1999 |
| JP | 11-284936 A | 10/1999 |

(Continued)

*Primary Examiner* — Trang U Tran
(74) *Attorney, Agent, or Firm* — Edwards Wildman Palmer LLP; David G. Conlin; David A. Tucker (57) ABSTRACT

A liquid crystal television includes a display module generating heat, a substrate having a mounting surface and being placed at an interval from the display module, a component group mounted on the mounting surface, and a housing storing the display module, the substrate, and the component group. The mounting surface includes a first surface extending opposite to the display module and a second surface placed at a rear side of the first surface. A component in the component group having the greatest height with respect to the mounting surface is mounted on the first surface of the first surface and the second surface. The housing is provided with a first air vent hole positioned below the substrate and a second air vent hole positioned above the substrate. An airflow circulating through the first air vent hole, space between the display module and the first surface, and the second air vent hole is created within the housing. With such structure, a display apparatus reduced in thickness and improved in cooling effect is provided.

2 Claims, 12 Drawing Sheets

FOREIGN PATENT DOCUMENTS

| | | |
|---|---|---|
| JP | 2001-022281 A | 1/2001 |
| JP | 2002-006754 A | 1/2002 |
| JP | 2002-341777 A | 11/2002 |
| JP | 2003-173147 A | 6/2003 |
| JP | 2005-317552 A | 11/2005 |
| JP | 2008-197391 A | 8/2008 |

* cited by examiner

|  | MAIN SUBSTRATE 51 | LIQUID CRYSTAL CONTROL SUBSTRATE 52 | POWER SUPPLY SUBSTRATE 54 |
|---|---|---|---|
| MODEL OF COMPARATIVE EXAMPLE | 84.6°C | 66.6°C | 66.0°C |
| MODEL OF PRESENT INVENTION | 82.5°C | 60.9°C | 65.6°C |

|  | COMPONENT 81 | COMPONENT 82 | COMPONENT 83 | COMPONENT 84 | COMPONENT 85 | COMPONENT 91 |
|---|---|---|---|---|---|---|
| MODEL OF FIRST COMPARATIVE EXAMPLE | 75.86°C | 73.78°C | 83.51°C | 72.13°C | 38.63°C | 54.30°C |
| MODEL OF SECOND COMPARATIVE EXAMPLE | 75.30°C | 73.70°C | 83.63°C | 72.46°C | 38.92°C | 42.25°C |
| MODEL OF PRESENT INVENTION | 74.73°C | 71.99°C | 82.50°C | 70.74°C | 38.74°C | 42.11°C |

FIG.12

DISPLAY APPARATUS

TECHNICAL FIELD

The present invention generally relates to a thin display apparatus such as a liquid crystal television, a plasma display television or a liquid crystal display, and more particularly relates to a thin display apparatus having a heat radiation structure for efficient radiation of heat generated by a display panel unit or a control circuit unit.

BACKGROUND ART

Among conventional display apparatus, Japanese Patent Laying-Open No. 2003-173147, for example, discloses a display apparatus intended to reliably suppress temperature rise (Patent Document 1). The display apparatus disclosed in Patent Document 1 includes a display panel that displays an image, a frame chassis that supports the display panel, and a circuit board that drives the display panel to display an image. A front design frame and a rear face cover are fixed respectively in front of and behind a module formed of the display panel, frame chassis and circuit board. A cooling fan is mounted on the frame chassis, and the rear face cover is provided with an intake hole and an exhaust hole for this cooling fan.

Japanese Patent Laying-Open No. 10-117315 discloses a heat radiation structure for a PDP (Plasma Display Panel) intended to forcefully exhaust air between the PDP and a driving circuit that has been raised in temperature by heat of the PDP, to thereby suppress temperature rise of the PDP (Patent Document 2). In the heat radiation structure for the PDP disclosed in Patent Document 2, the driving circuit board with a driving circuit for the plasma display panel mounted thereon is placed to the rear face side of the plasma display panel at a required interval. An electrode led out to the outer periphery of the plasma display panel and a conductor led out to the outer periphery of the driving circuit board are connected via a flat cable. This driving circuit board has a ventilation hole pierced therethrough, and further has a first exhaust fan attached thereto. Driving of the first exhaust fan allows air between the plasma display panel and the driving circuit board to be exhausted through the ventilation hole.

Patent Document 1: Japanese Patent Laying-Open No. 2003-173147

Patent Document 2: Japanese Patent Laying-Open No. 10-117315

DISCLOSURE OF THE INVENTION

Problems to be Solved by the Invention

As disclosed in the aforementioned Patent Documents 1 and 2, there is known a structure of a display apparatus, such as a liquid crystal television, provided with a motor fan for internal cooling. However, providing such a motor fan arises problems such as dust accumulated in a cabinet, noise occurring due to wind noise, increased consumption power, and increased likelihood of failure of the fan that is a mechanically movable component. A fanless structure is thus becoming the mainstream in recent years.

On the other hand, there is a recent trend toward thinner housings of display apparatus in order to enhance industrial competitiveness. Such a trend toward thickness reduction causes problems such as blocking of airflow within the apparatus, internal temperature rise, thermal runaway of on-board components, and shorter lives of components.

Figure 12:
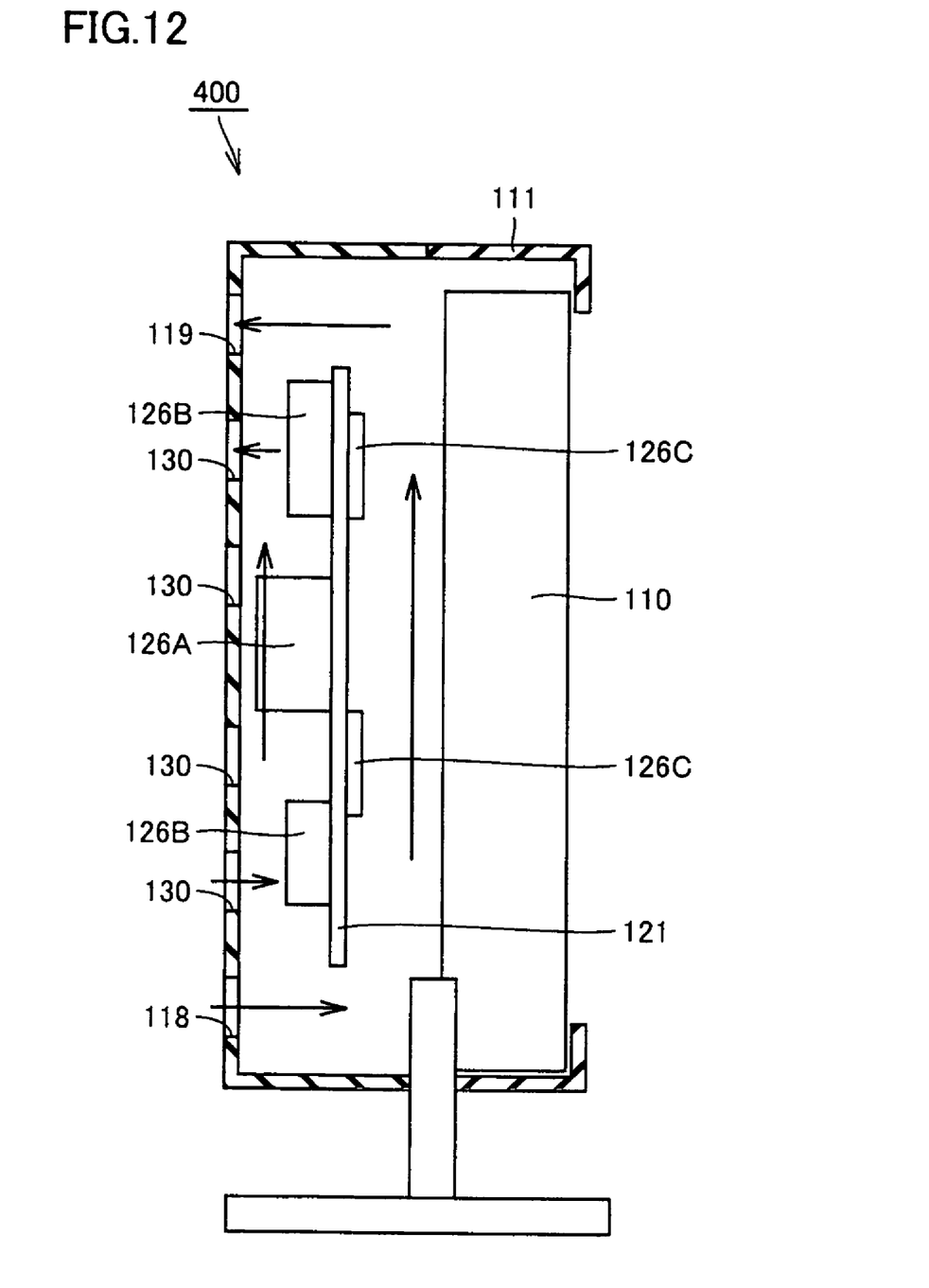
FIG. 12 is a sectional view of a liquid crystal television having a fanless structure.

FIG. 12 is a sectional view of a liquid crystal television having a fanless structure. With reference to FIG. 12, a liquid crystal television 400 includes a display module 110 with a built-in backlight unit, as well as a substrate 121 with a plurality of components 126A, 126B and 126C mounted thereon. Display module 110 and substrate 121 are placed at an interval therebetween.

More than half of the amount of heat generated in liquid crystal television 400 is radiated by a cold-cathode tube serving as a light source of the backlight and the like. In liquid crystal television 400, a housing 111 storing display module 110 and substrate 121 is provided with air vent holes 118, 119 and 130 allowing inflow/outflow of air, in order to cool down devices that generate heat. Natural convection causes air flown into housing 111 to circulate through space between display module 110 and substrate 121 as a main flow path, during which display module 110 is air-cooled.

Liquid crystal television 400 shown in FIG. 12, however, has a problem in that creation of the main flow path of air between display module 110 and substrate 121 increases housing 111 in thickness. Thus, requirements for a thinner liquid crystal television are less likely to be fully satisfied.

It is therefore an object of the present invention to solve the above-described problems, and to provide a display apparatus reduced in thickness and improved in cooling effect.

Means for Solving the Problems

According to a first aspect of the present invention, a display apparatus includes a display module generating heat, a substrate, a component group, and a housing. The substrate has a mounting surface and is placed at an interval from the display module. The component group is mounted on the mounting surface. The housing stores the display module, the substrate, and the component group. The mounting surface includes a first surface extending opposite to the display module and a second surface placed at a rear side of the first surface. A component in the component group having the greatest height with respect to the mounting surface is mounted on the first surface selected from the first surface and the second surface. The housing is provided with a first air vent hole positioned below the substrate and a second air vent hole positioned above the substrate. An airflow circulating through the first air vent hole, space between the display module and the first surface, and the second air vent hole is created within the housing.

In the display apparatus of such structure, the component having the greatest height in the component group mounted on the mounting surface is mounted on the first surface, so that the interval between the second surface and the housing can be reduced while ensuring a large cross sectional area of the flow path in the space between the display module and the first surface in which the airflow is created. Accordingly, the display apparatus can be reduced in thickness while improving the cooling effect exerted by the airflow within the housing.

Preferably, the component group further includes a component mounted on the second surface. In the display apparatus of such structure, mounting the component having a relatively small height on the second surface can reduce the interval between the second surface and the housing.

According to another aspect of the present invention, a display apparatus includes a display module generating heat, a substrate, a first component group and a second component group, and a housing. The substrate has a first surface extending opposite to the display module and a second surface placed at a rear side of the first surface, the substrate being placed at an interval from the display module. The first component group and a second component group generate heat, and are mounted on the first surface and the second surface, respectively. The housing stores the display module, the substrate, the first component group, and the second component group. A total amount of heat generated by the first component group is greater than the total amount of heat generated by the second component group. The housing is provided with a first air vent hole positioned below the substrate and a second air vent hole positioned above the substrate. An airflow circulating through the first air vent hole, space between the display module and the first surface, and the second air vent hole is created within the housing.

In the display apparatus of such structure, mounting the first component group generating a relatively greater amount of heat and more strongly requiring cooling, on the first surface extending opposite to the display module generating heat allows the flow path of air circulating within the housing to be concentrated in the space between the display module and the first surface. This can reduce the interval between the second surface and the housing. Accordingly, the display apparatus can be reduced in thickness while improving the cooling effect exerted by the airflow within the housing.

Preferably, the housing includes a rear portion extending at a position opposite to the second surface at an interval from the substrate. An interval between the first surface and the display module is larger than the interval between the second surface and the rear portion. In the display apparatus of such structure, the interval between the second surface and the rear portion is reduced, so that the display apparatus can be reduced in thickness.

Preferably, the housing includes a rear portion extending at a position opposite to the second surface at an interval from the substrate. The holes allowing air to flow between the housing and space outside thereof are not present in an area of the rear portion opposite to the second surface. In the display apparatus of such structure, a component having the greatest height usually generates a greater amount of heat than another component, so that the amount of heat generated on the second surface is smaller. Accordingly, the structure in which no hole is provided in the area of a side portion opposite to the second surface can improve the value of design of the housing, reduce the production cost, and reduce the likelihood that foreign matters may enter the housing. In addition, since the second component group generating a relatively smaller total amount of heat is mounted on the second surface, the amount of heat generated on the second surface is smaller. Accordingly, the structure in which no hole is provided in the area of the side portion opposite to the second surface can achieve the aforementioned effects.

Preferably, the display apparatus further includes a thermally conductive member provided on the second surface and placed in proximity to the housing. In the display apparatus of such structure, the thermally conductive member promotes thermal conduction from the substrate to the housing. Accordingly, heat radiation through the housing can be performed efficiently, which can further improve the cooling effect.

Preferably, the airflow is created by natural convection. In the display apparatus of such structure, noise and power consumption can be reduced as compared to the case of using a motor fan. Moreover, dust can be prevented from entering the housing, and the cooling structure can be improved in reliability.

Preferably, the display apparatus further includes an additional substrate stored in the housing and provided separately from the substrate. The additional substrate is placed in a path of airflow from the first air vent hole to the space between the display module and the first surface, and positioned such that an interval between the display module and the additional substrate is smaller than the interval between the first air vent hole and the additional substrate. The display apparatus of such structure can ensure the cross sectional area of the flow path of air from the first air vent hole to the space between the display module and the first surface, and smooth the airflow. Accordingly, the cooling effect exerted by the airflow within the housing can be fully achieved.

Effects of the Invention

As described above, the present invention can provide a display apparatus reduced in thickness and improved in cooling effect.

DESCRIPTION OF THE REFERENCE SIGNS 10 display module; 11 housing; 14 rear portion; 15 area; 18 lower air vent hole; 19 upper air vent hole; 21, 71 substrate; 22 mounting surface; 22*a* main surface; 22*b* non-main surface; 26 component group; 26A, 26B, 26C, 81 to 86, 91 to 93 components; 32 space; 41 thermally conductive pad; 100, 200, 300 liquid crystal television.

BEST MODES FOR CARRYING OUT THE INVENTION

With reference to the drawings, description will be given of embodiments of the present invention. In the drawings described below, identical or corresponding members are denoted by an identical reference numeral.

(First Embodiment)

Figure 1:
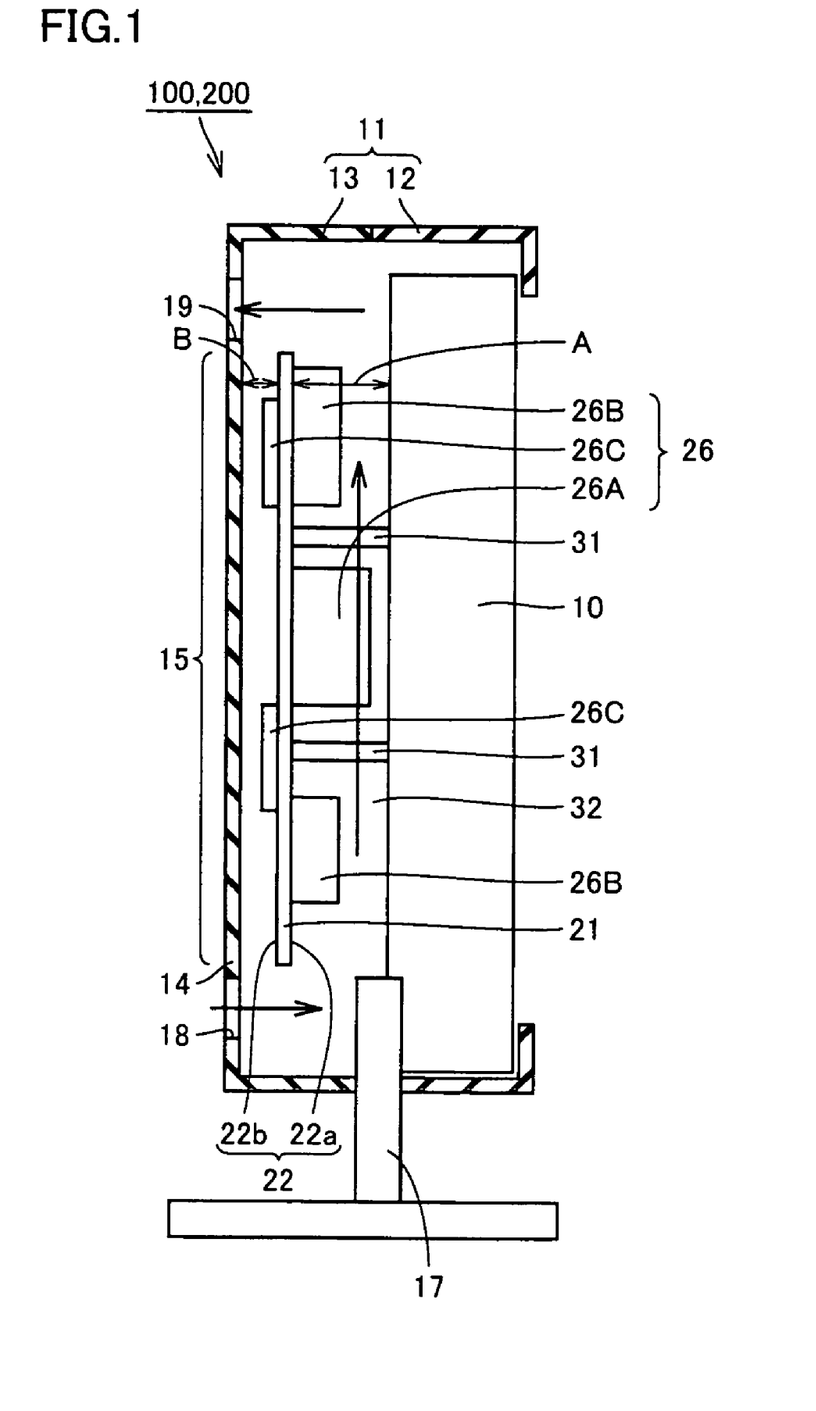
FIG. 1 is a sectional view showing a liquid crystal television according to first and second embodiments of the present invention.

FIG. 1 is a sectional view showing a liquid crystal television according to first and second embodiments of the present invention. With reference to FIG. 1, a basic structure of liquid crystal television 100 according to the present embodiment will be described. Liquid crystal television 100 includes a display module 10 generating heat, a substrate 21 having a mounting surface 22 and placed at an interval from display module 10, a component group 26 mounted on mounting surface 22, and a housing 11 storing display module 10, substrate 21, and component group 26. Mounting surface 22 includes a main surface 22a as a first surface extending opposite to display module 10 and a non-main surface 22b as a second surface placed at the rear side of main surface 22a. A component 26A in component group 26 having the greatest height with respect to mounting surface 22 is mounted on main surface 22a selected from main surface 22a and non-main surface 22b. Housing 11 is provided with a lower air vent hole 18 as a first air vent hole positioned below substrate 21 and an upper air vent hole 19 as a second air vent hole positioned above substrate 21. An airflow circulating through lower air vent hole 18, space 32 between display module 10 and main surface 22a, and upper air vent hole 19 is created in housing 11.

The structure of liquid crystal television 100 shown in FIG. 1 will now be described in detail. A liquid crystal display mechanism with a liquid crystal panel and a light source such as a cold-cathode tube or a light emitting diode integrated therein and if necessary, a backlight, a diffuser or a reflector are stored in a sheet metal case to implement display module 10 as a module. The display apparatus according to the present invention is not limited to a liquid crystal television. For example, the liquid crystal display mechanism may be replaced by a self-emission display mechanism, such as a plasma display panel, an organic EL (electroluminescence) panel, and a field emission display, as a display module.

Housing 11 includes a front housing 12 placed to the front side of liquid crystal television 100 (on which an image is displayed) and a rear housing 13 placed to the rear side. Front housing 12 and rear housing 13 are joined together with fastening members such as screws. Display module 10 is placed substantially at a central position of front housing 12. Rear housing 13 includes a rear portion 14. Rear portion 14 extends at a position opposite to non-main surface 22b of substrate 21 at an interval from substrate 21. Rear portion 14 extends substantially in parallel to non-main surface 22b.

Housing 11 is supported by a stand 17 connected to the lower portion of front housing 12 and rear housing 13. Substrate 21 is secured by substrate-supporting columns 31. Substrate-supporting columns 31 are connected to display module 10. In other words, substrate 21 is supported by display module 10 via substrate-supporting columns 31.

Figure 2:
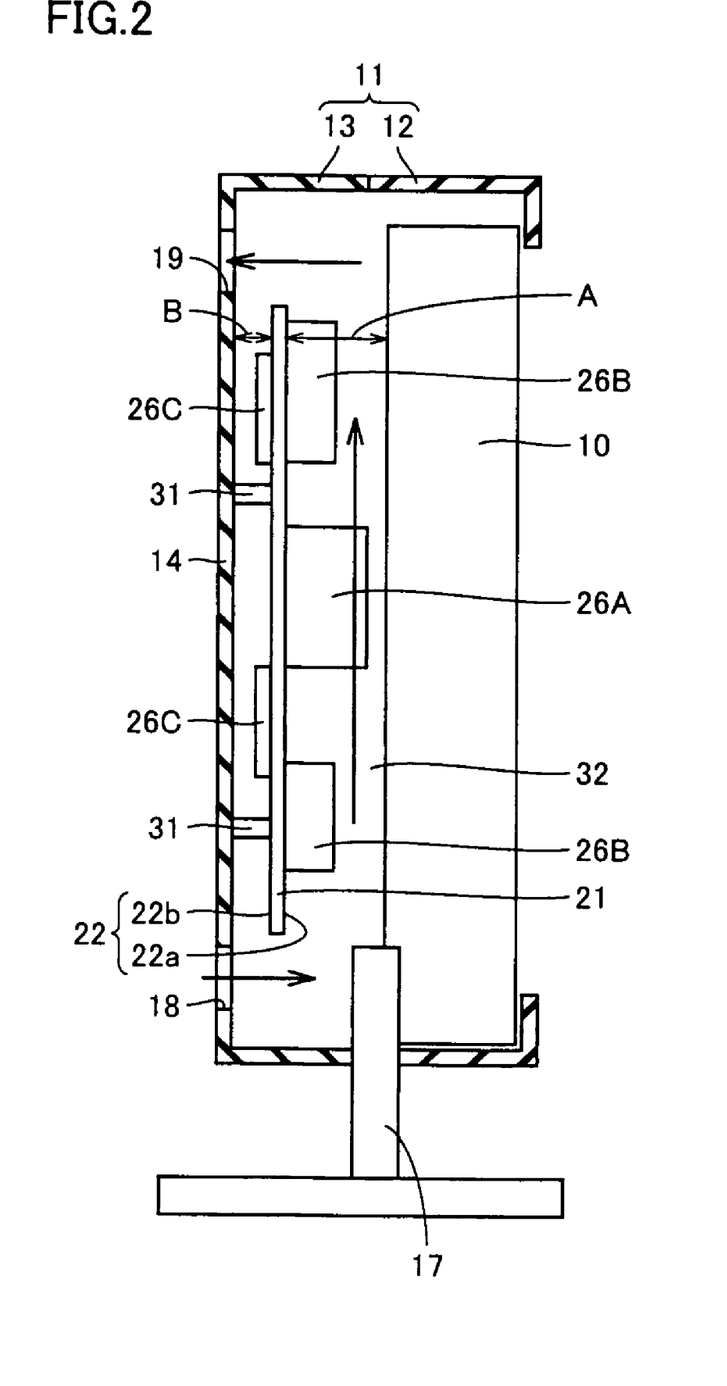
FIG. 2 is a sectional view showing a first modification of the liquid crystal television shown in FIG. 1.

FIG. 2 is a sectional view showing a first modification of the liquid crystal television shown in FIG. 1. With reference to FIG. 2, according to the present modification, substrate-supporting columns 31 are connected to rear portion 14 of rear housing 13. In this case, substrate 21 is supported by housing 11 via substrate-supporting columns 31. Alternatively, substrate-supporting columns 31 may be connected indirectly to display module 10 or rear housing 13 via another component (not shown) provided on display module 10 or rear housing 13.

With reference to FIG. 1, substrate 21 is placed in space within housing 11 at an interval from display module 10 and rear portion 14. Substrate 21 is placed such that mounting surface 22 extends in parallel to display module 10. Space 32 is left between main surface 22a of substrate 21 and display module 10.

Component group 26 including a plurality of components 26A, 26B and 26C is mounted on mounting surface 22. Components 26A and 26B are mounted on main surface 22a of substrate 21, while component 26C is mounted on non-main surface 22b of substrate 21.

Component 26A has the greatest height with respect to mounting surface 22 in component group 26 mounted on mounting surface 22. More specifically, the height of component 26A with respect to mounting surface 22 (i.e., the length from main surface 22a to the top of component 26A) is greater than the height of component 26B with respect to mounting surface 22 (i.e., the length from main surface 22a to the top of component 26B), and greater than the height of component 26C with respect to mounting surface 22 (i.e., the length from main surface 22a to the top of component 26C).

By way of example, component 26A is a component formed of an LSI and a heat sink for heat radiation stacked thereon. In this case, the height of component 26A is the length from main surface 22a to the top of the heat sink including the thickness of the LSI. Component 26A may be an electronic component such as a transformer or a coil, or a shielding case covering substrate 21 entirely for reducing electromagnetic radiation.

By way of example, the other component 26B mounted on main surface 22a may include an LSI, a resistor, a diode, a capacitor, a connector, a transistor, or the like. By way of example, component 26C mounted on non-main surface 22b may include a chip resistor, an LSI, or the like.

While the present embodiment has addressed the case in which components are mounted both on main surface 22a and non-main surface 22b of substrate 21, any component may not be necessarily mounted on non-main surface 22b, and a structure in which components are mounted only on main surface 22a may be employed.

Housing 11 is provided with lower air vent hole 18 and upper air vent hole 19. Lower air vent hole 18 and upper air vent hole 19 are implemented by holes extending through rear portion 14. Lower air vent hole 18 is positioned below substrate 21, and upper air vent hole 19 is positioned above substrate 21. Defining an area 15 opposite to non-main surface 22b of substrate 21 on rear portion 14, lower air vent hole 18 and upper air vent hole 19 are placed in an area of rear portion 14 except area 15.

Natural convection of air is created in liquid crystal television 100 which flows into housing 11 through lower air vent hole 18, passes through space 32 between display module 10 and main surface 22a, and flows out of housing 11 through upper air vent hole 19, as indicated by arrows in FIG. 1. This airflow cools display module 10 generating more than half of heat within housing 11, as well as components 26A and 26B on main surface 22a, so that heat generated by these heat sources is discharged efficiently out of housing 11.

According to the present embodiment, component 26A having the greatest height in component group 26 is mounted on main surface 22a opposite to display module 10. Such a structure can reduce an interval B between non-main surface 22b and rear portion 14 while ensuring a long interval A between main surface 22a and display module 10 to increase a cross sectional area of the airflow path created in space 32 (A>B).

Component 26A having the greatest height is generally likely to generate a great amount of heat. In this case, necessary and sufficient cooling can be performed without providing any air vent hole in area 15 on rear portion 14, since less heat is generated at non-main surface 22b side of substrate 21. With the structure without providing any air vent hole in area 15 on rear portion 14, housing 11 is simplified in design, resulting in a higher commercial value. A metal mold used in producing housing 11 has a simple structure, so that the cost for mold is reduced. Since resin is easy to fill and filling time is short when producing housing 11 by injection molding, the production tact time is short, and less shrinkage or warpage occurs. Foreign matters can be less likely to enter housing 11 through rear portion 14.

Figure 3:
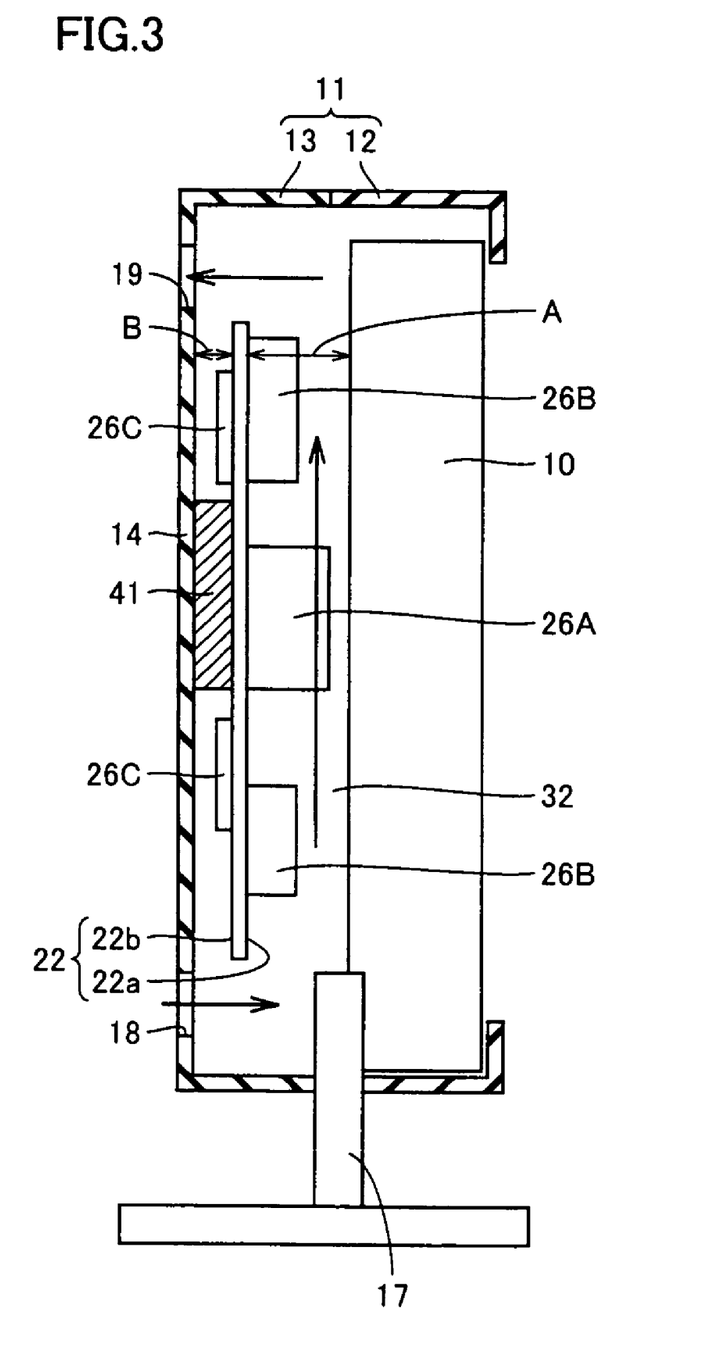
FIG. 3 is a sectional view showing a second modification of the liquid crystal television shown in FIG. 1.

FIG. 3 is a sectional view showing a second modification of the liquid crystal television shown in FIG. 1. With reference to FIG. 3, the liquid crystal television according to the present modification further includes a thermally conductive pad 41 as a thermally conductive member provided on non-main surface 22b and positioned in proximity to housing 11.

Thermally conductive pad 41 is placed in contact with non-main surface 22b and rear portion 14. Thermally conductive pad 41 is made of a material such as metal or resin having a favorable thermal conductivity. According to the present modification, thermally conductive pad 41 is made of resin having a thermal conductivity ranging from 0.5 to 2 (W/m/K). This resin is soft or gel-like (or is dissolved by heating) to adhere to an adhesive surface of non-main surface 22b. Preferably, thermally conductive pad 41 is implemented in a plate form whose thickness is smaller than its length and width. Heat transfer ability is in proportion to the value of thermal conductivity×contact area, and thus can be improved by the implementation in the plate form. Thermally conductive pad 41 is not limited to this, but may be implemented by placing the aforementioned resin on both sides of a metal plate, or merely by a metal plate.

Figure 4:
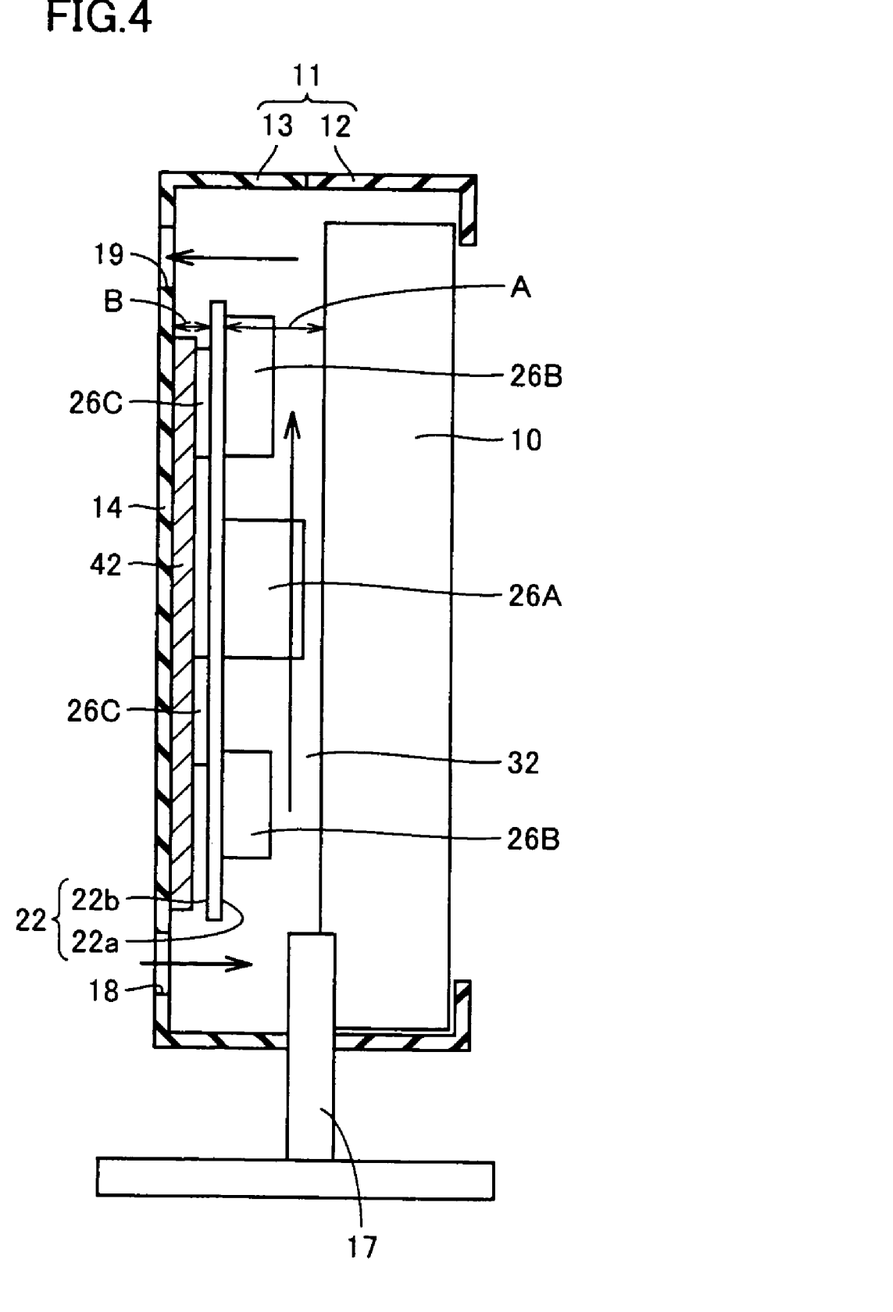
FIG. 4 is a sectional view showing a third modification of the liquid crystal television shown in FIG. 2.

FIG. 4 is a sectional view showing a third modification of the liquid crystal television shown in FIG. 2. With reference to FIG. 4, according to the present modification, thermally conductive pad 41 is placed in contact with component 26C mounted on non-main surface 22b and rear portion 14.

According to the modifications shown FIGS. 3 and 4, heat can be radiated efficiently out of housing 11 by promoting thermal conduction from substrate 21 to rear portion 14 via thermally conductive pad 41. Although it is desirable that thermally conductive pad 41 and rear portion 14 adhere to each other, a minute gap (e.g., a gap of approximately 0.3 mm) may be present therebetween owing to manufacturing errors. Even in this case, the thermal conductive effect from substrate 21 to rear portion 14 can be achieved to some extent.

Liquid crystal television 100 thus structured according to the first embodiment of the present invention can be reduced in thickness while improving the cooling effect achieved by the airflow created in space 32. In addition, according to the present embodiment, internal cooling of housing 11 is achieved by natural convection of air, so that noise and power consumption can be reduced as compared to the case of using a motor fan. Moreover, dust can be prevented from entering housing 11, and the cooling structure can be improved in reliability.

A thermal fluid simulation conducted for confirming the above effects will now be described. The present simulation employed the following simulation model specified more than liquid crystal television 100 shown in FIG. 1.

Figure 5:
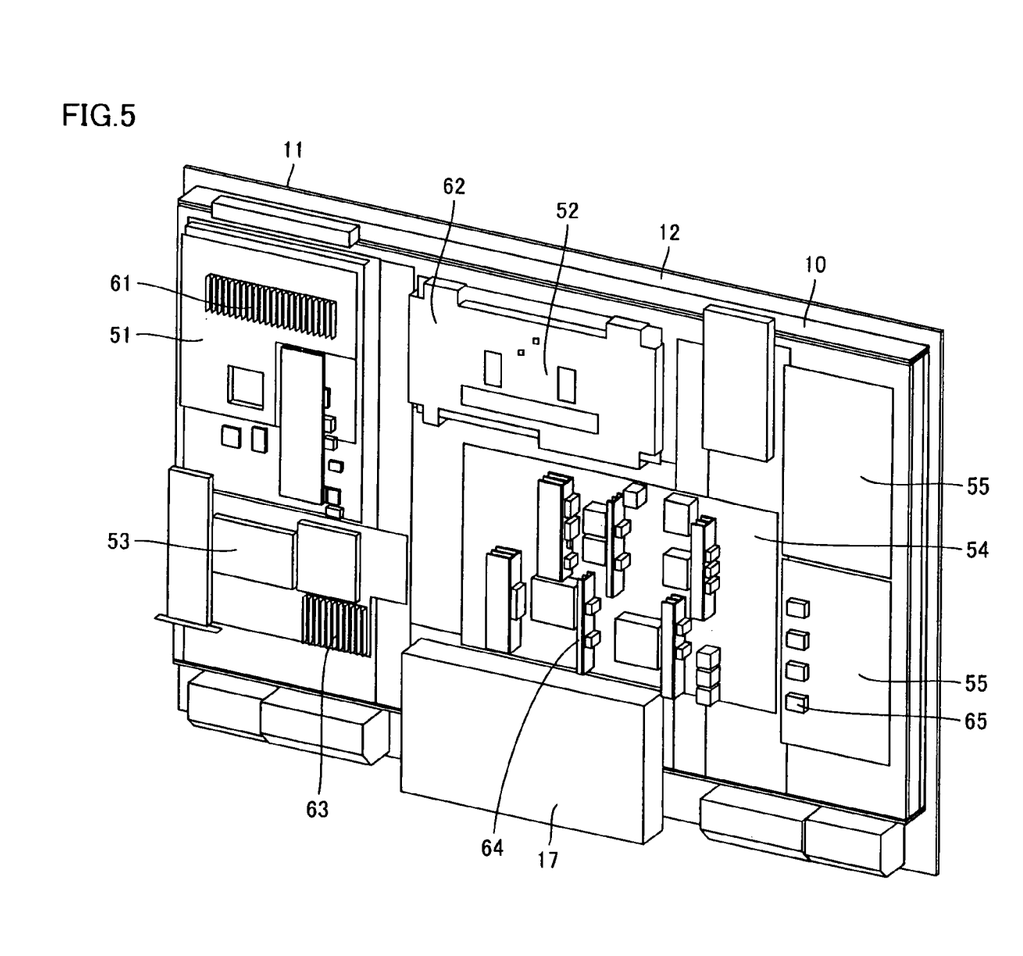
FIG. 5 is a perspective view of a simulation model according to a comparative example as viewed from its rear face.
Figure 6:
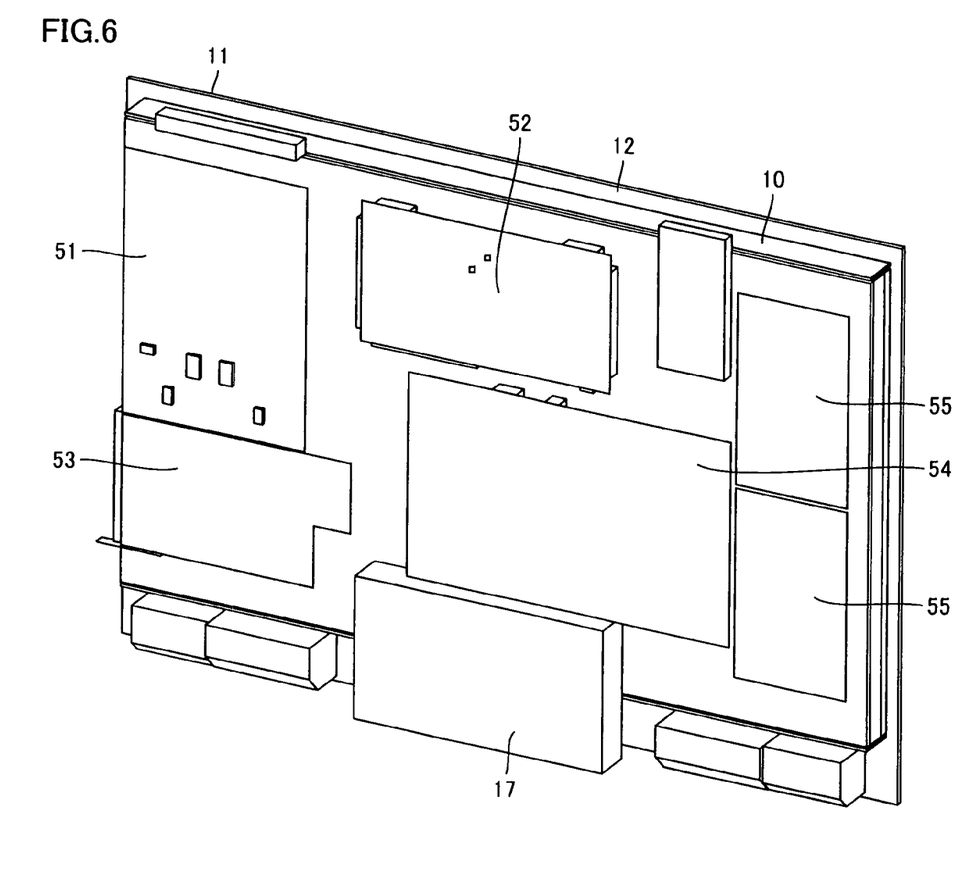
FIG. 6 is a perspective view of a simulation model according to the present invention as viewed from its rear face.

FIG. 5 is a perspective view of a simulation model according to a comparative example as viewed from its rear face. FIG. 6 is a perspective view of a simulation model according to the present invention as viewed from its rear face. In these drawings, rear housing 13 shown in FIG. 1 is seen through so as to clarify the internal structure, but indeed exists in the actual simulation model. The simulation model according to the present invention shown in FIG. 6 is implemented by reversing each substrate in the simulation model according to the comparative example shown in FIG. 5.

With reference to FIGS. 5 and 6, housing 11 stores, as substrate 21 shown in FIG. 1, a main substrate 51, a liquid crystal control substrate 52, a terminal substrate 53, a power supply substrate 54, and an inverter substrate 55. A heat sink 61, a shielding case 62, a heat sink 63, a heat sink 64, and an electronic component 65 are mounted on main substrate 51, liquid crystal control substrate 52, terminal substrate 53, power supply substrate 54, and inverter substrate 55, respectively, as component 26A shown in FIG. 1 having the greatest height.

Figure 7A:
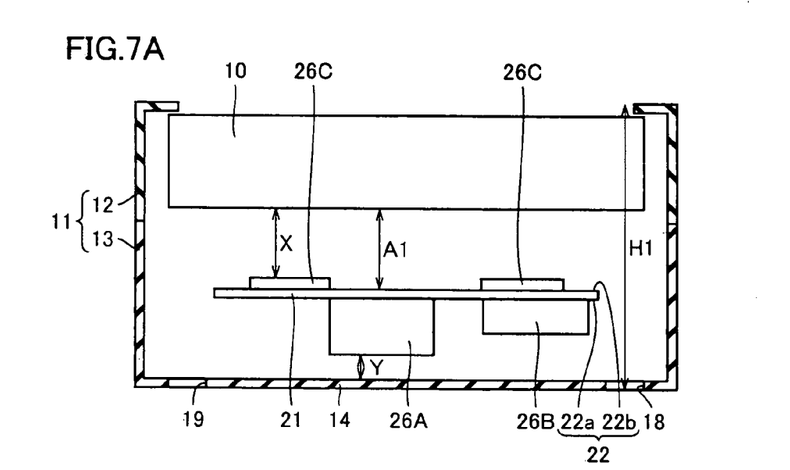
FIG. 7A is a sectional view for explaining a difference between the simulation models shown in FIGS. 5 and 6.

FIGS. 7A, 7B and 7C are sectional views for explaining a difference between the simulation models shown in FIGS. 5 and 6. FIG. 7A schematically shows the simulation model according to the comparative example shown in FIG. 5. In the simulation model according to the comparative example, substrate 21 is placed such that non-main surface 22b and display module 10 are opposite to each other, and main surface 22a and rear portion 14 of housing 11 are opposite to each other. The interval between component 26C mounted on non-main surface 22b and display module 10 is represented by X, the interval between component 26A mounted on main surface 22a and rear portion 14 by Y, and the interval between non-main surface 22b and display module 10 by A1. In this case, the total thickness of housing 11 is represented by H1.

Figure 7B:
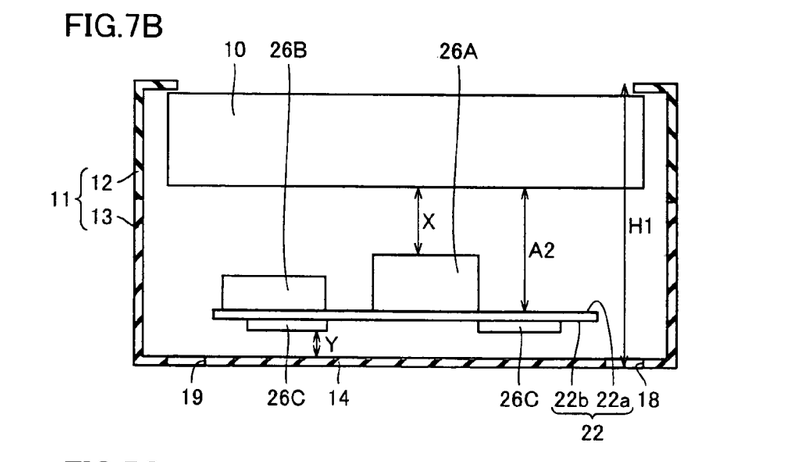
FIG. 7B is a sectional view for explaining a difference between the simulation models shown in FIGS. 5 and 6.

FIG. 7B shows an intermediate model with substrate 21 reversed with respect to the simulation model according to the comparative example shown in FIG. 7A while X and Y are unchanged. In this intermediate model, the interval between main surface 22a and display module 10 is represented by A2, where the relation of A2>A1 holds. The total thickness of housing 11 in this case is H1, which is equal to that in the comparative example shown in FIG. 7A.

Figure 7C:
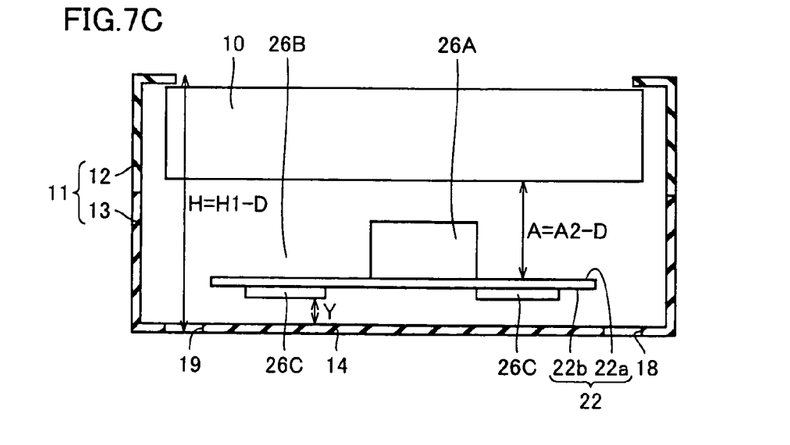
FIG. 7C is a sectional view for explaining a difference between the simulation models shown in FIGS. 5 and 6.

FIG. 7C schematically shows the simulation model according to the present invention shown in FIG. 6. In the simulation model according to the present invention, substrate 21 and rear portion 14 are brought closer to display module 10 by an interval D such that A=A2−D holds (while keeping interval Y shown in the drawings constant). Total thickness H of housing 11 in this case is H=H1−D. In this simulation, the setting was such that H1=80 mm and D=4 mm. As a result, total thickness H in the simulation model according to the present invention was 76 mm, which achieved reduction in thickness.

Figure 8:
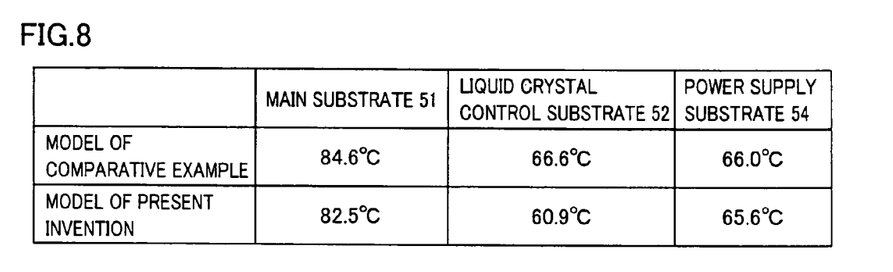
FIG. 8 shows the temperature of each substrate calculated from the simulation models shown in FIGS. 5 and 6.

FIG. 8 shows the temperature of each substrate calculated from the simulation models shown in FIGS. 5 and 6. With reference to FIG. 8, shapes of main substrate 51, liquid crystal control substrate 52, terminal substrate 53, power supply substrate 54, and inverter substrate 55 placed in housing 11 as well as the respective components mounted on these substrates were entered, and conditions of heat generation corresponding to consumption power during an actual operation of the liquid crystal television are entered into the respective components. Both the models shown in FIGS. 5 and 6 were subjected to a thermal fluid analysis by a finite volume method to calculate temperatures of main substrate 51, liquid crystal control substrate 52, and power supply substrate 54. The results reveal that the temperature of each component of the simulation model according to the present invention shown in FIG. 6 is equal to or lower than that of the simulation model according to the comparative example shown in FIG. 5, so that an improvement in cooling effect could be confirmed.

(Second Embodiment)

A liquid crystal television 200 according to a second embodiment of the present invention has a structure substantially similar to that of liquid crystal television 100 described in the first embodiment. An overlapping part of structure to that of liquid crystal television 100 described in the first embodiment will not be repeated here.

With reference to FIG. 1, a basic structure of liquid crystal television 200 according to the present embodiment will be described. Liquid crystal television 200 includes display module 10 generating heat, substrate 21 having main surface 22a as a first surface extending opposite to display module 10 and non-main surface 22b as a second surface placed at the rear side of main surface 22a, substrate 21 being placed at an interval from display module 10, components 26A and 26B as a first component group and component 26C as a second component group generating heat mounted respectively on main surface 22a and non-main surface 22b, and housing 11 storing display module 10, substrate 21, components 26A, 26B and 26C. The total amount of heat generated by components 26A and 26B is greater than that of heat generated by component 26C. Housing 11 is provided with lower air vent hole 18 as a first air vent hole positioned below substrate 21 and upper air vent hole 19 as a second air vent hole positioned above substrate 21. An airflow circulating through lower air vent hole 18, space 32 between display module 10 and main surface 22a, and upper air vent hole 19 is created within housing 11.

The structure of liquid crystal television 200 according to the present embodiment will now be described in detail. In the present embodiment, components 26A and 26B are mounted on main surface 22a, and component 26C on non-main surface 22b. While the first embodiment has described that any component may not be necessarily mounted on non-main surface 22b, components are mounted both on main surface 22a and non-main surface 22b in the present embodiment.

The total amount of heat generated by components 26A and 26B mounted on main surface 22a is greater than that of heat generated by component 26C mounted on non-main surface 22b. As a method of measuring the amount of heat generation, a heat flux meter is attached to the surface (ideally, both of the front face and rear face) of each of components 26A, 26B and 26C while operating, to measure the amount of heat generation radiated from each component. Alternatively, the amount of heat generation may be measured by measuring the temperature rise of each component while operating and assuming that: temperature rise ∝ heat generation amount of component/volume of component. By way of example, components 26A and 26B generating a relatively greater total amount of heat include a CPU, a voltage conversion element, a current amplifying element, or the like.

According to the present embodiment in which components 26A and 26B generating a greater amount of heat and more strongly requiring cooling are mounted on main surface 22a facing display module 10 generating heat, the main flow path of air circulating within housing 11 can be concentrated in space 32 between display module 10 and main surface 22a. This can reduce interval B between rear portion 14 and non-main surface 22b, which achieves reduction in thickness of liquid crystal television 200 (A>B).

Components 26A and 26B generating a greater amount of heat and requiring cooling and display module 10 generating heat can share space 32 as a common airflow path. Accordingly, the friction resistance of the walls against airflow can be reduced as compared to the case of ensuring separate airflow paths for cooling components 26A, 26B and display module 10, respectively. This can increase the speed of airflow and improve the cooling effect.

Since components 26A and 26B generating a greater amount of heat are mounted on main surface 22a opposite to display module 10, natural convection of air circulating through lower air vent hole 18, space 32 and upper air vent hole 19 is promoted. This enables efficient cooling of components 26A, 26B and display module 10.

Liquid crystal television 200 thus structured according to the second embodiment of the present invention can achieve effects similar to those of liquid crystal television 100 according to the first embodiment.

(Third Embodiment)

Figure 9:
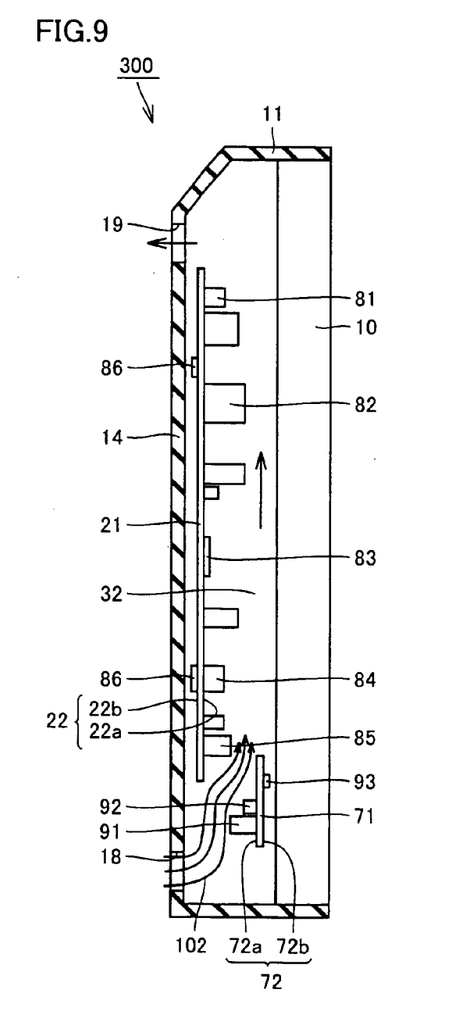
FIG. 9 is a sectional view showing a liquid crystal television according to a third embodiment of the present invention.

FIG. 9 is a sectional view showing a liquid crystal television according to a third embodiment of the present invention. A liquid crystal television 300 according to the present embodiment has a structure basically similar to that of liquid crystal television 100 according to the first embodiment. An overlapping part of structure will not be repeated here.

With reference to FIG. 9, components 81 to 85 (including a component having the greatest height in the component group mounted on substrate 21) are mounted on main surface 22a of substrate 21 in a manner similar to component group 26 according to the first embodiment, and a component 86 is mounted on non-main surface 22b.

Liquid crystal television 300 according to the present embodiment further includes a substrate 71 as an additional substrate provided separately from substrate 21. Substrate 71 is placed in a path of air flown through lower air vent hole 18 flows toward space 32.

Substrate 71 has a mounting surface 72. Mounting surface 72 has a smaller area than mounting surface 22 of substrate 21. Mounting surface 72 includes a main surface 72a with components 91 and 92 mounted thereon as well as a non-main surface 72b with a component 93 mounted thereon. Component 91 is a component having the greatest height in the component group mounted on mounting surface 72. Substrate 71 is placed such that main surface 72a and rear portion 14 are opposite to each other, and non-main surface 72b and display module 10 are opposite to each other. In other words, substrate 71 is placed in such a manner that substrate 21 is reversed, and positioned such that the interval between display module 10 and substrate 71 is smaller than that between lower air vent hole 18 and substrate 71.

When placing substrate 71 in proximity to lower air vent hole 18, the cross sectional area of flow path of airflow from lower air vent hole 18 to space 32 needs to be fully ensured. According to the present embodiment, placing substrate 71 in a reversed manner relative to substrate 21 can ensure a long interval between substrates 21 and 71. This can smooth airflow from lower air vent hole 18 to space 32, which improves the cooling effect within housing 11.

Liquid crystal television 300 thus structured according to the third embodiment of the present invention can achieve effects similar to those in the first embodiment even with substrate 71 other than substrate 21 is placed in proximity to lower air vent hole 18.

A thermal fluid simulation conducted for confirming the above effects will now be described. In the present embodiment, the model shown in FIG. 9 was employed as a simulation model of the present invention. The flow velocity distribution was measured in the simulation model of the present invention shown in FIG. 9, which in result reveal that a smooth airflow was created between lower air vent hole 18 and space 32, as indicated by arrows 102 in the drawing.

Figure 10A:
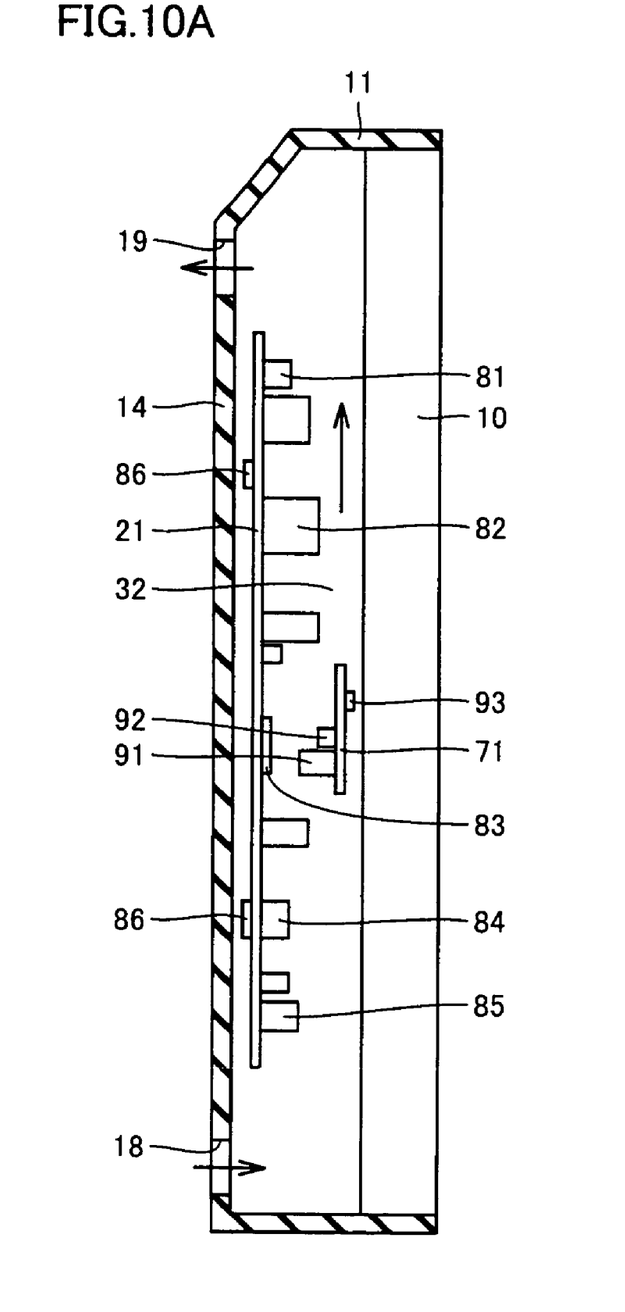
FIG. 10A is a sectional view of a simulation model according to a comparative example.
Figure 10B:
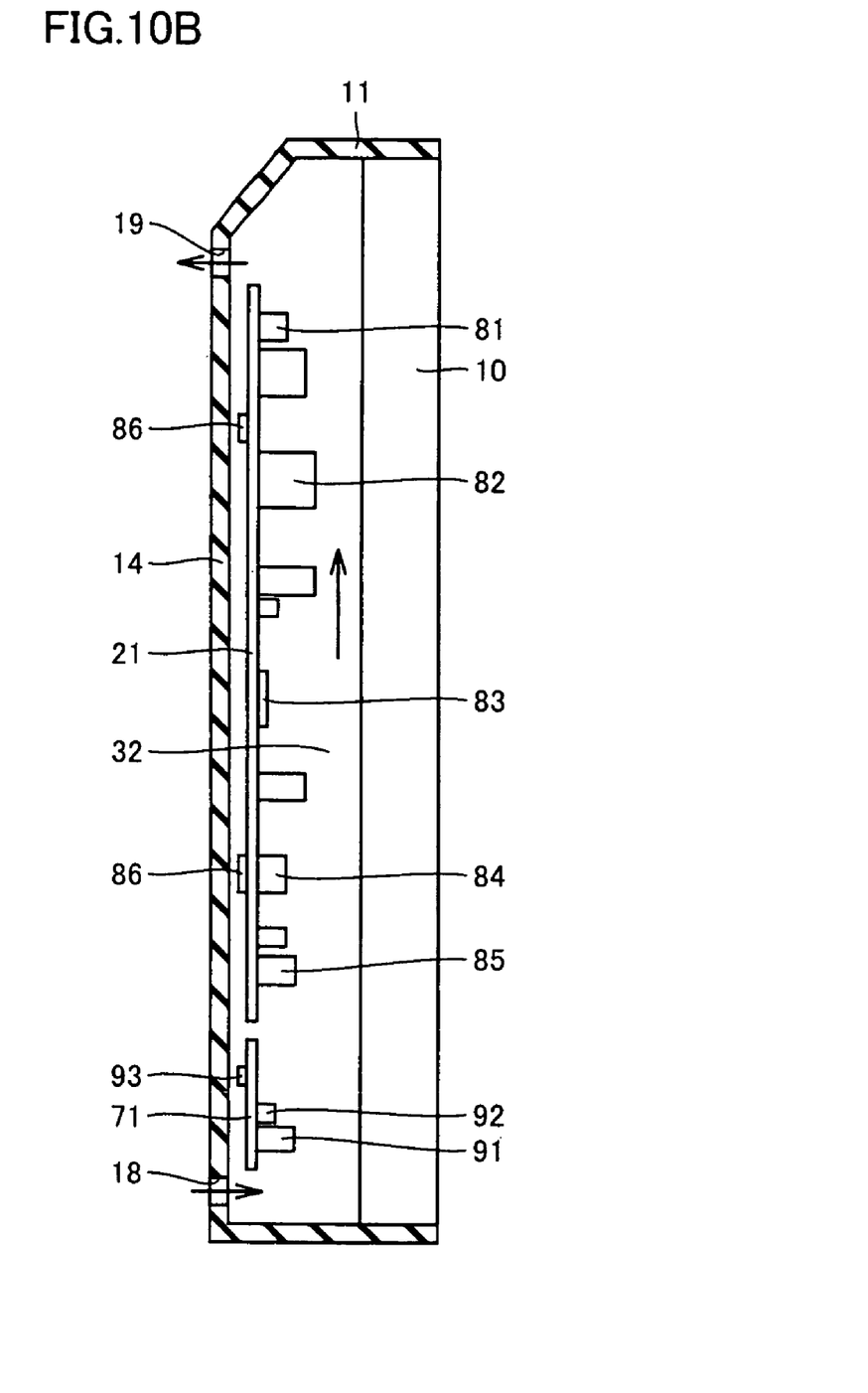
FIG. 10B is a sectional view of a simulation model according to a comparative example.

FIGS. 10A and 10B are sectional views of simulation models according to comparative examples. In the simulation model according to a first comparative example shown in FIG. 10A, substrate 71 shown in FIG. 9 is placed at a position in the path in space 32 opposite to substrate 21. In the simulation model according to a second comparative example shown in FIG. 10B, substrate 71 is placed in a reversed manner relative to the manner shown in FIG. 9. Substrates 71 and 21 are placed on the same plane.

Figure 11:
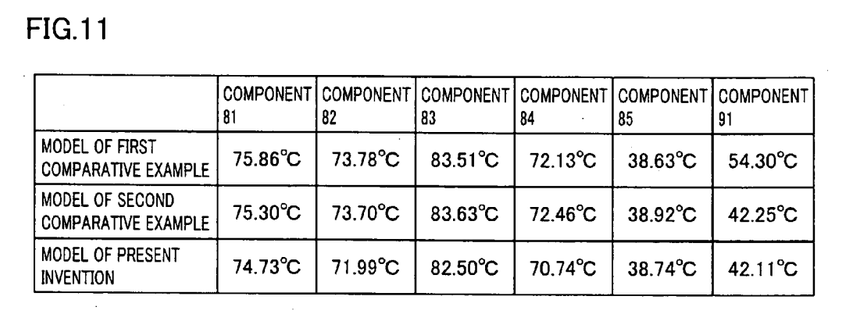
FIG. 11 shows the temperature of each substrate calculated from the simulation models shown in FIGS. 9, 10A and 10B.

FIG. 11 shows the temperature of each substrate calculated from the simulation models shown in FIGS. 9, 10A and 10B. With reference to FIG. 11, the simulation models shown in FIGS. 9, 10A and 10B were subjected to a thermal fluid analysis by a finite volume method to calculate temperatures of components 81 to 85 and 91. The results reveal that the temperature of each component of the simulation model according to the present invention shown in FIG. 9 is equal to or lower than that of the simulation models according to the first and second comparative examples shown in FIGS. 10A and 10B, which reveals that the cooling effect was improved.

While the present embodiment has addressed the structure in which substrate 71 is provided in liquid crystal television 100 according to the first embodiment, substrate 71 may be provided in liquid crystal television 200 according to the second embodiment in the manner shown in FIG. 9. Alternatively, the structure of each modification described in the first embodiment may be combined into liquid crystal television 200 or 300 according to the second or third embodiment.

It should be construed that embodiments disclosed herein are by way of illustration in all respects, not by way of limitation. It is intended that the scope of the present invention is defined by claims, not by the description above, and includes all modifications equivalent in meaning and scope to the claims.

Industrial Applicability

The present invention is mainly applied to a thin display apparatus such as a liquid crystal television, a plasma display television or a liquid crystal display.

The invention claimed is:

1. A display apparatus comprising:
a display module generating heat;
a substrate having a mounting surface and being placed at an interval from said display module;
a component group mounted on said mounting surface;
a housing storing said display module, said substrate, and said component group, wherein
(i) said mounting surface includes a first surface extending opposite to said display module and a second surface placed at a rear side of said first surface,
(ii) a component in said component group having the greatest height with respect to said mounting surface is mounted on said first surface selected from said first surface and said second surface,
(iii) said housing is provided with a first air vent hole positioned below said substrate and a second air vent hole positioned above said substrate, and
(iv) an airflow circulating through said first air vent hole, space between said display module and said first surface, and said second air vent hole is created within said housing, and
and additional substrate stored in said housing and provided separately from said substrate, said additional substrate being placed in a path of airflow from said first air vent hole to the space between said display module and said first surface, and positioned such that an interval between said display module and said additional substrate is smaller than an interval between said first air vent hole and said additional substrate.

2. A display apparatus comprising:
a display module generating heat;
a substrate having a first surface extending opposite to said display module and a second surface placed at a rear side of said first surface, said substrate being placed at an interval from said display module;
a first component group and a second component group generating heat and being mounted on said first surface and said second surface, respectively; and
a housing storing said display module, said substrate, said first component group, and said second component group, wherein
(i) a total amount of generated by said first component group is greater than a total amount of heat generated by said second component group,
(ii) said housing is provided with a first air vent hole positioned below said substrate and a second air vent hole positioned above said substrate, and
(iii) an airflow circulating through said first air vent hole, a space between said display module and said first surface, and said second air vent hole is created within said housing, and
and additional substrate stored in said housing and provided separately from said substrate, said additional substrate being placed in a path of airflow from said first air vent hole to the space between said display module and said first surface, and positioned such that an interval between said display module and said additional substrate is smaller than an interval between said first air vent hole and said additional substrate.

* * * * *